INVENTOR.
Leo Goldman

INVENTOR
Leo Goldman

BY Strauch, Nolan & Neale
ATTORNEYS

June 14, 1966   L. GOLDMAN   3,255,838
STEER DRIVE AXLE WITH INTERNAL SEAL
Filed Feb. 5, 1963   6 Sheets-Sheet 3

INVENTOR
Leo Goldman

BY *Strauch, Nolan & Neale*

ATTORNEYS

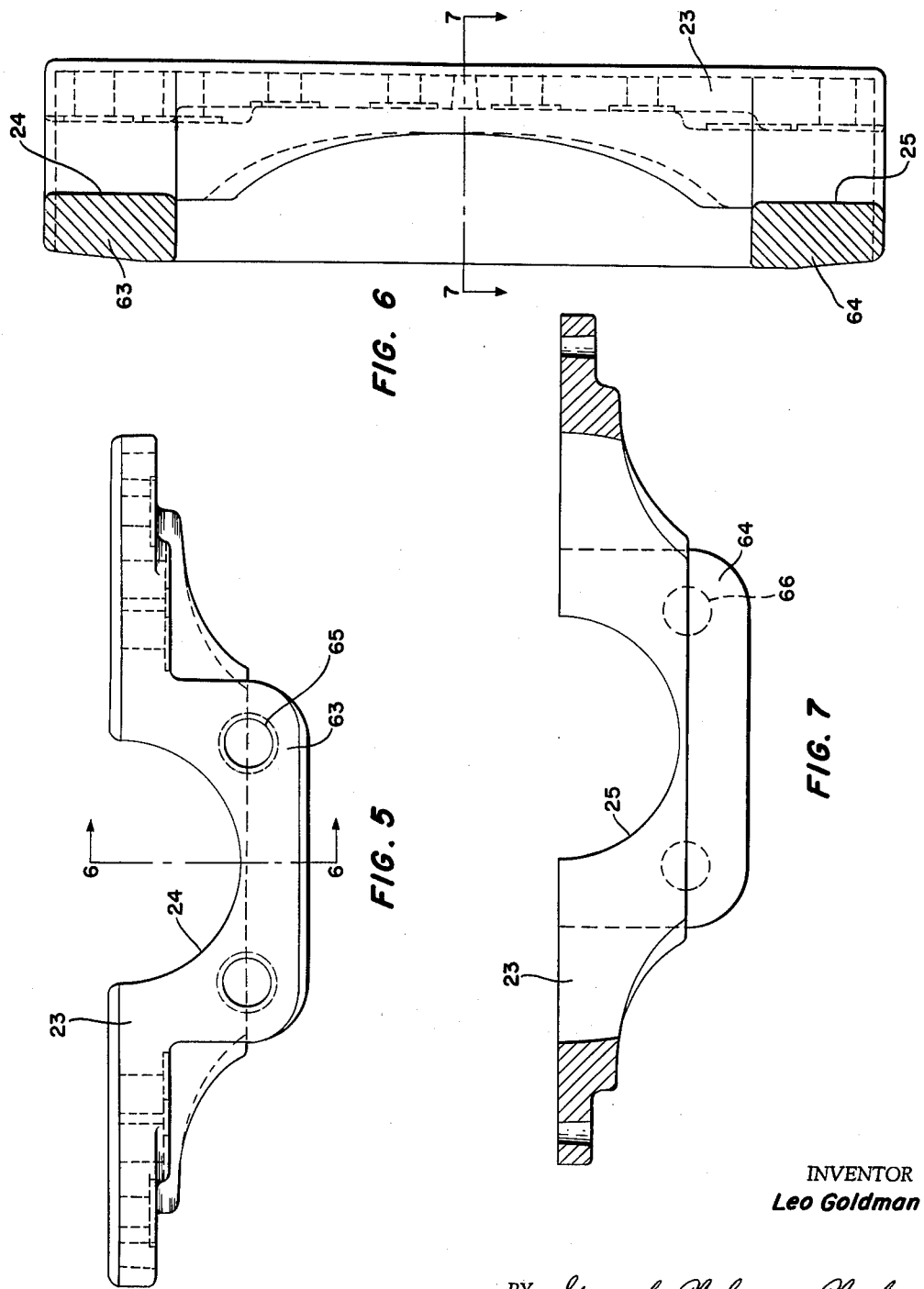

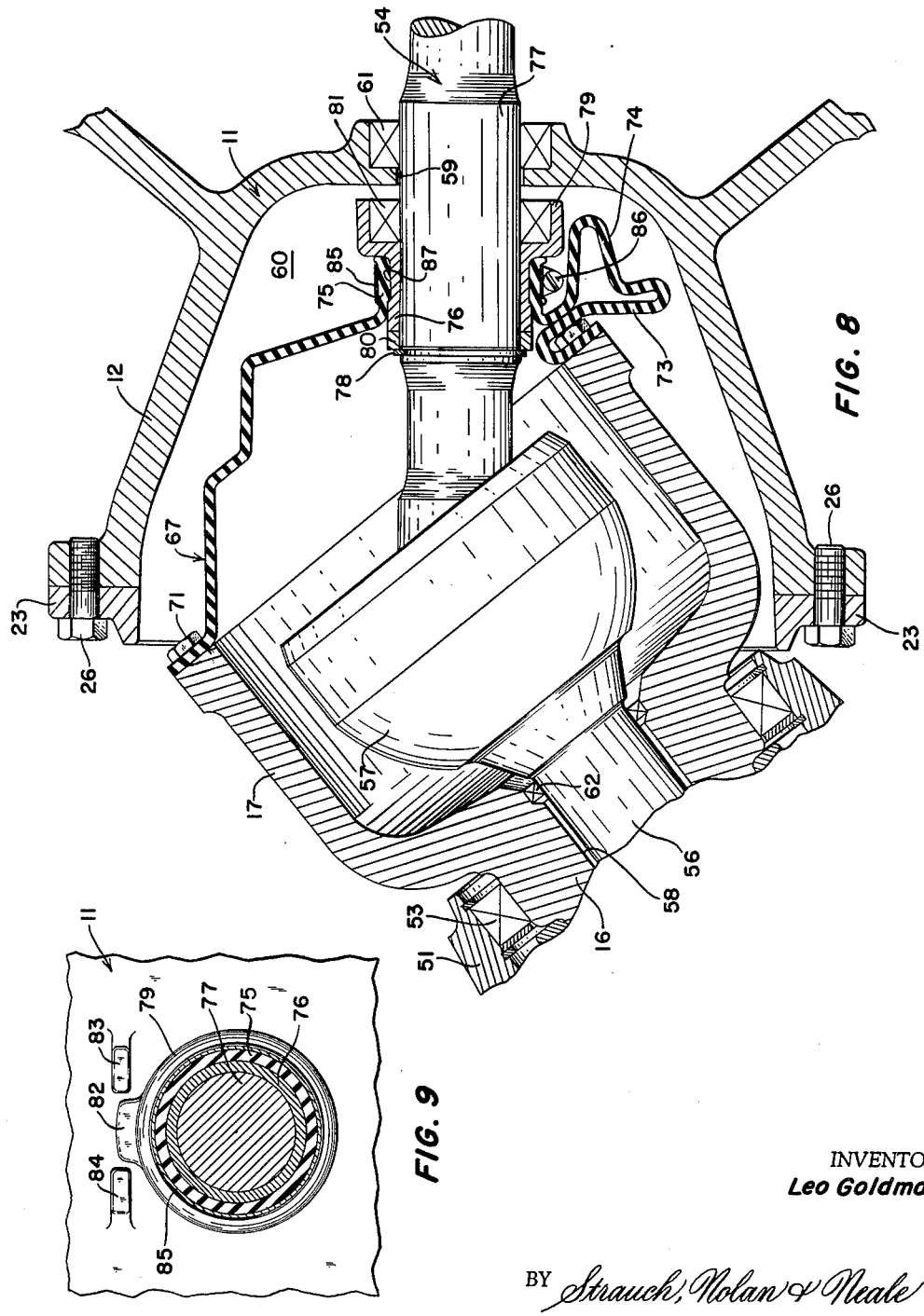

June 14, 1966 L. GOLDMAN 3,255,838
STEER DRIVE AXLE WITH INTERNAL SEAL
Filed Feb. 5, 1963 6 Sheets-Sheet 6

INVENTOR
Leo Goldman

BY *Strauch, Nolan & Neale*
ATTORNEYS

United States Patent Office 3,255,838
Patented June 14, 1966

3,255,838
STEER DRIVE AXLE WITH INTERNAL SEAL
Leo Goldman, Windsor, Ontario, Canada, assignor, by mesne assignments, to Rockwell-Standard Corporation, a corporation of Delaware
Filed Feb. 5, 1963, Ser. No. 256,325
3 Claims. (Cl. 180—43)

This invention relates to steer drive axles and is particularly concerned with the structural relationship of parts at the axle ends and sealing arrangements therefor.

Prior to the invention known steer drive axle assemblies comprised at opposite ends bell-like housings having generally vertical external trunnions on which was journaled a wheel mounting spindle having a corresponding bell-like housing extending over the axle housing end and journaled on the trunnions. During steering of the vehicle the spindle swings a limited amount in either direction about the common axis of the trunnions. An enlarged space is thus provided within the bell-like housings to receive the universal joint structure of the drive axle shaft assembly which extends through the axle housing and the spindle to drive the wheel mounted on the spindle.

The present invention provides an unexpectedly improved axle outer end structure wherein the spindle is journaled on internal trunnions in the enlarged outer end of an axle housing and special internal sealing arrangements are provided, preferably between the inner end of the spindle and the axle shaft assembly, or the axle housing.

Prior to the invention, where the enlarged spindle inner end extended over the axle outer end, annular external flexible sealing members have been used, to keep out dirt and moisture and prevent the escape of lubricant, but such seals were exposed for physical damage and deterioration. In these prior axle structures internal seals were not possible as a practical matter, and internal seals were almost impossible to provide in such structures where the steering requirements involved a 35° turning angle in both directions.

It is the major object of this invention to provide a novel steer drive axle structure wherein the wheel mounting spindles are specially journalled on trunnions internally of enlarged axle housing outer ends.

A further object of the invention is to provide a steer drive axle assembly wherein the wheel mounting spindle is journaled within the axle housing outer end and a novel internal seal structure is incorporated.

Another object of the invention is to provide a steer drive axle assembly wherein the axle housing has an outwardly open enlarged end portion and the inner end of the wheel mounting spindle has trunnions rigid therewith and extending outwardly to be journaled in said housing end portions.

A further object of the invention is to provide a novel steer drive axle assembly wherein a novel adapter retains trunnions on the inner end of the wheel mounting spindle onto the enlarged outer end of an axle housing.

It is a further object of the invention to provide a novel steer drive axle assembly wherein the enlarged outer end of the axle housing is formed with trunnion receiving recesses for receiving trunnions on the inner end of a wheel mounting spindle, and an annular adapter also recessed to receive said trunnion mount said spindle in the assembly.

Another object of the invention is to provide a novel internal seal for a steer drive axle end structure.

It is a further object of the invention to provide a steer drive axle assembly wherein the inner end of the wheel mounting spindle is journaled within the end of the axle housing and a novel annular flexible seal effective in all relative angular displacements of the spindle and housing is mounted on the inner end of the wheel mounting spindle. In one form of the invention this seal is of generally bellows structure with special attachment to the axle shaft assembly inwardly of the universal joint. In another form of the invention this seal directly coacts with the axle housing. The invention includes as its further objects these specific seal structures.

Further objects of the invention will appear as the description proceeds in connection with the appended claims and the annexed drawings wherein:

FIGURE 5 is an elevation view of the trunnion adapter;

FIGURE 6 is a section on line 6—6 of FIGURE 5;

FIGURE 7 is a section on line 7—7 of FIGURE 6;

FIGURE 8 is a sectional view of the steer drive axle structure of FIGURE 1 taken in a plane at right angles to that of FIGURE 1 and showing in plan the axle and seal structure when the wheel has been turned for steering of the vehicle;

FIGURE 9 is a section on line 9—9 of FIGURE 1 showing seal structure detail;

Figure 1:
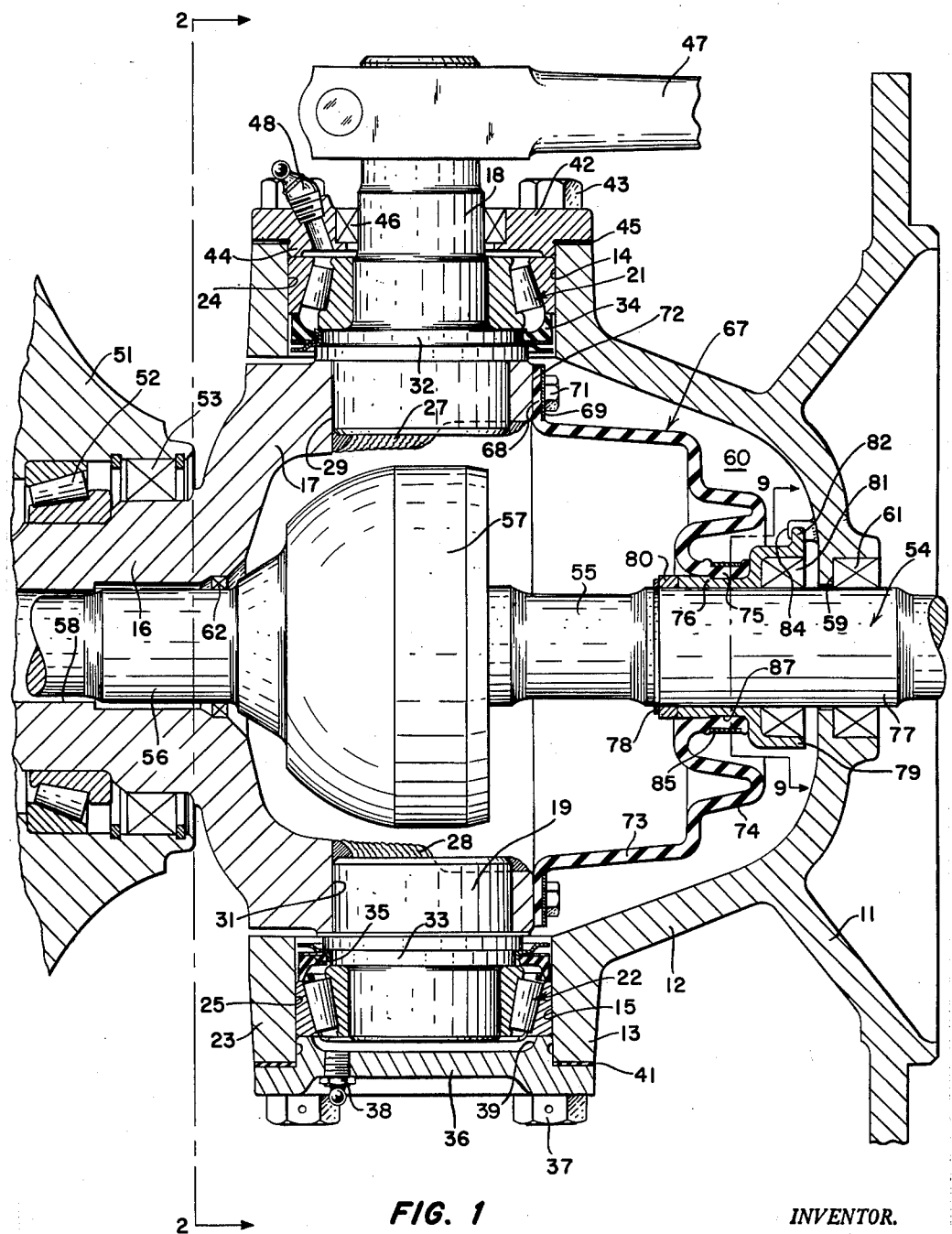
FIGURE 1 is a section through a steer drive axle assembly according to a preferred embodiment of the invention, showing novel axle structure and a special sealing arrangement.

Referring to FIGURES 1–9, an axle housing 11 non-rotatably connected to a vehicle frame, as by springs (not shown) is formed with an enlarged substantially semi-spherical bell-like outer end portion 12 having an axially outward opening surrounded by a trunnion flange 13.

Flange 13 (FIGURES 1 and 4) has substantially vertically aligned upper and lower recesses 14 and 15 that face axially outwardly. A wheel mounting spindle 16 has an enlarged substantially semi-spherical bell-like inner end 17 having an axially inward opening. Rigid with the wheel mounting spindle are oppositely projecting upper and lower trunnions 18 and 19 which extend into tapered roller bearing assemblies 21 and 22 respectively seated in housing recesses 14 and 15. A generally annular trunnion adapted plate 23, which is formed with upper and lower trunnion bearing receiving recesses 24 and 25 (FIGURES 1 and 6) is secured upon trunnion flange 13 of the axle housing as by a series of stud bolts 26 (FIGURE 2).

Figure 2:
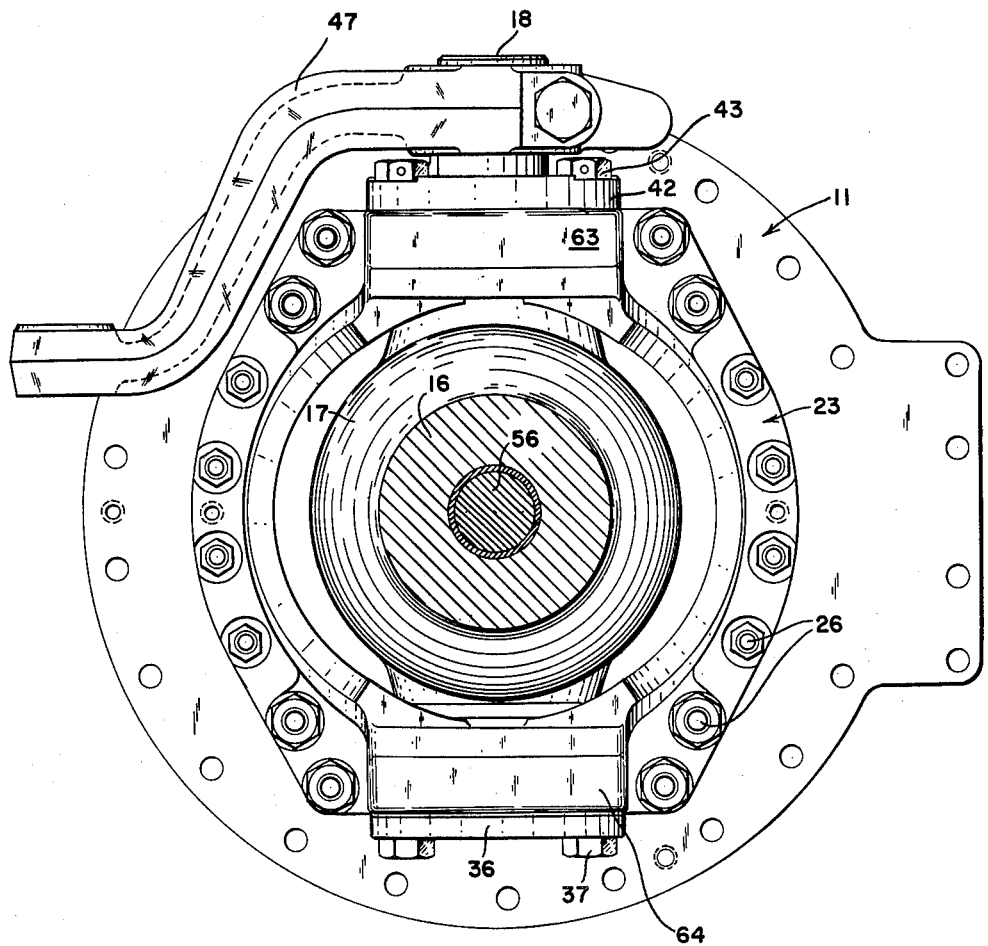
FIGURE 2 is a section on line 2—2 of FIGURE 1 showing further structural detail.

As shown in FIGURE 1, trunnions 18 and 19 are cylindrical and are welded at 27 and 28 respectively to the wheel spindle at their extreme inner ends where they project from vertically aligned bores 29 and 31 respectively. The trunnions 18 and 19 are shouldered at 32 and 33 respectively to mount similar grease seals 34 and 35 that act essentially to retain lubricant in the spaces around bearings 21 and 22.

Across the lower end of the bottom trunnion bearing recesses 15, 25 a closure plate 36 is secured as by bolts 37, and a grease fitting 38 enables lubrication of the bearing 22.

Internally plate 36 has a flange 39 piloted within the trunnion bearing recess and axially abutting the outer race of bearing 22. The inner race of bearing 22 abuts trunnion shoulder 33, so that plate 36 loads bearing 22 and the thickness of the sealing and/or shim assembly at 41 may determine the bearing loading.

Similarly the upper end of upper trunnion bearing recesses 14, 24 is closed by an annular plate 32 secured to the axle housing as by bolts 43. Here the inner plate flange 44 abuts the outer race of bearing 21 and the inner race of bearing 21 abuts trunnion shoulder 32, with sealing means and/or shims at 45 to determine the bearing loading.

A grease seal 46 is provided between plate 42 and the upper end of trunnion 18 projecting therethrough, and a steering arm 47 is fixed by means of serrations or the like on trunnion 18. A grease fitting 48 enables lubrication of bearing 21. When arm 47 is rocked, as by the usual drag link (not shown), the wheel spindle rocks about the common vertical axis of trunnions 18 and 19. By vertical I mean to include slight angular departures from true vertical, as for usual front wheel caster and camber in conventional king pin practice.

In FIGURE 1, the ground engaging wheel 51 is rotatably mounted by bearings 52 on the wheel mounting spindle 16, and a grease retainer seal 53 is provided between them.

A drive shaft assembly 54 comprising a driven inner shaft section 55, an outer stub shaft section 56 nonrotatably connected to the wheel 51 by usual means (not shown) and a universal joint 57 in the enlarged space 60 enclosed by the housing outer end portion 12 and the spindle inner end portion 17. Universal joint 57, details of which are not shown, is preferably of any conventional type like that disclosed in Keese Patent 1,995,987 with its center of turning lying on the common axis of trunnions 18 and 19 in the assembly.

Figure 4:
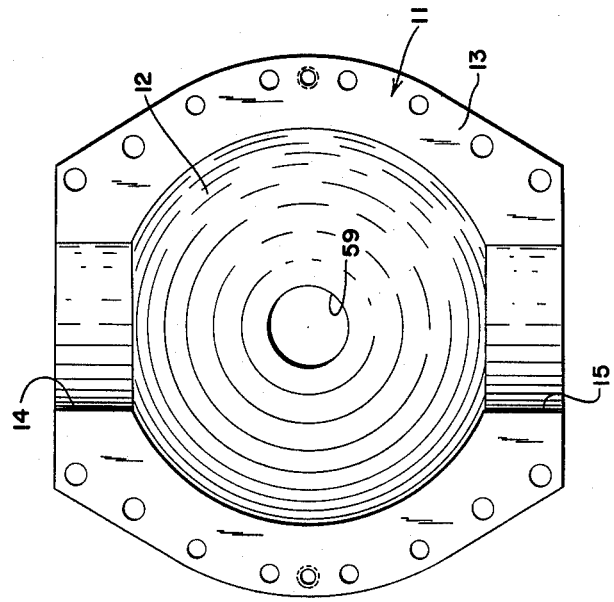
FIGURE 4 is an end view of the axle housing showing the trunnion flange to which the adapter is secured.
Figure 3:
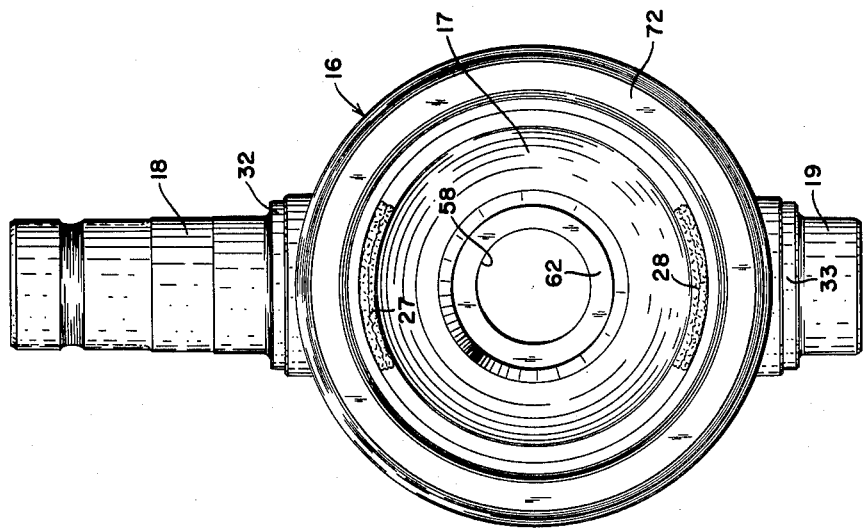
FIGURE 3 is an end view of the spindle assembly with the trunnions in place.

Referring to FIGURES 3 and 4, it will be noted that the spindle 16 has a central bore 58 through which freely extends stub shaft section 56, and the axle housing 11 has a central bore 59 through which freely extends drive shaft section 56. Suitable seals are provided at 61 and 62 between the drive shaft sections and the axle housing and spindle respectively.

It will be noted that the adapter plate 23 is formed with upper and lower bosses 63 and 64 (FIGURES 2 and 5–7) where the trunnion bearing receiving recesses 24 and 25 are provided. Upper boss 63 has threaded bores 65 for receiving the outer bolts 43, and lower boss 64 has threaded bores 66 to receive the outer bolts 37, so that the upper and lower closure plates 36 and 42 are bolted to both the axle housing and adapter plate to help hold them in rigid assembly.

Referring now to FIGURES 1, 8 and 9 one form of internal seal 67 is shown, as supplementary to the protective action of conventional seals 61 and 62.

In this embodiment the seal 67 is a flexible boot-type seal comprising an annulus of flexible synthetic rubber or the like of approximate bell shape with its larger end formed to a radial flange 68 which is secured tightly upon and over the inner end of spindle 16, as by a stiff metal clamping ring 69 and a series of machine screws 71 whereby flange 68 is sealingly compressed against the flat annular end face 72 of the spindle.

Seal 67 extends inwardly from the spindle 16 as a tubular body 73 to a pleated or bellows-like end section 74 centrally formed with a tubular small diameter boss 75 snugly surrounding a metal sleeve 76 which is snugly rotatably and slidably mounted on the smooth cylindrical section 77 of drive shaft 54. Outward displacement of sleeve 76 is prevented by abutment with a relatively stationary wear ring 80 that is press fitted upon shaft 54, and at its outer end wear ring 80 abuts a snap ring 78 axially fixed on the drive shaft. Inward displacement of sleeve 76 is effectively limited by the axle housing.

Sleeve 76 has its larger inner end 79 enlarged to mount a suitable compression seal 81 that has rotatable and slidable running contact with the shaft surface at 77. A radial projection 82 on sleeve 76 extends between two fixedly spaced projections 83 and 84 (FIGURE 9) on the axle housing wall, to thereby prevent rotation of the sleeve 76 with the drive shaft.

The inner end of seal 67 is clamped upon sleeve 76 by a flexible metal strap 85 surrounding boss 75 and drawn tight by a screw at 86 (FIGURE 8). Note that sleeve 76 is grooved at 87 so that the compressed material of boss 75 is deformed thereinto and forms an axial lock with the sleeve as well as a fluid tight seal.

Effectively therefore the annular seal 67 is fixed upon and over the inner end of spindle 16 and has a relatively rotatable and slidable fluid tight seal connection with the drive shaft axially inwardly of the universal joint of the drive shaft. This prevents any dust or dirt from penetrating the universal joint housing at 57.

FIGURE 8 shows the structure of FIGURE 1 when the ground engaging wheel has been turned up to its limit of about 35° during steering. It will be noted that the seal 67 maintains its effectiveness entirely during all of this turning and without interfering either with the steering or the drive shaft rotation. Actually the seal end wall 74 merely expands at one side and collapses on the other as illustrated in FIGURE 8, and the limited slidable rotatable mounting of sleeve 76 on the drive shaft permits whatever slight sliding and/or rotating may be necessary to prevent binding with the shaft.

Figure 10:
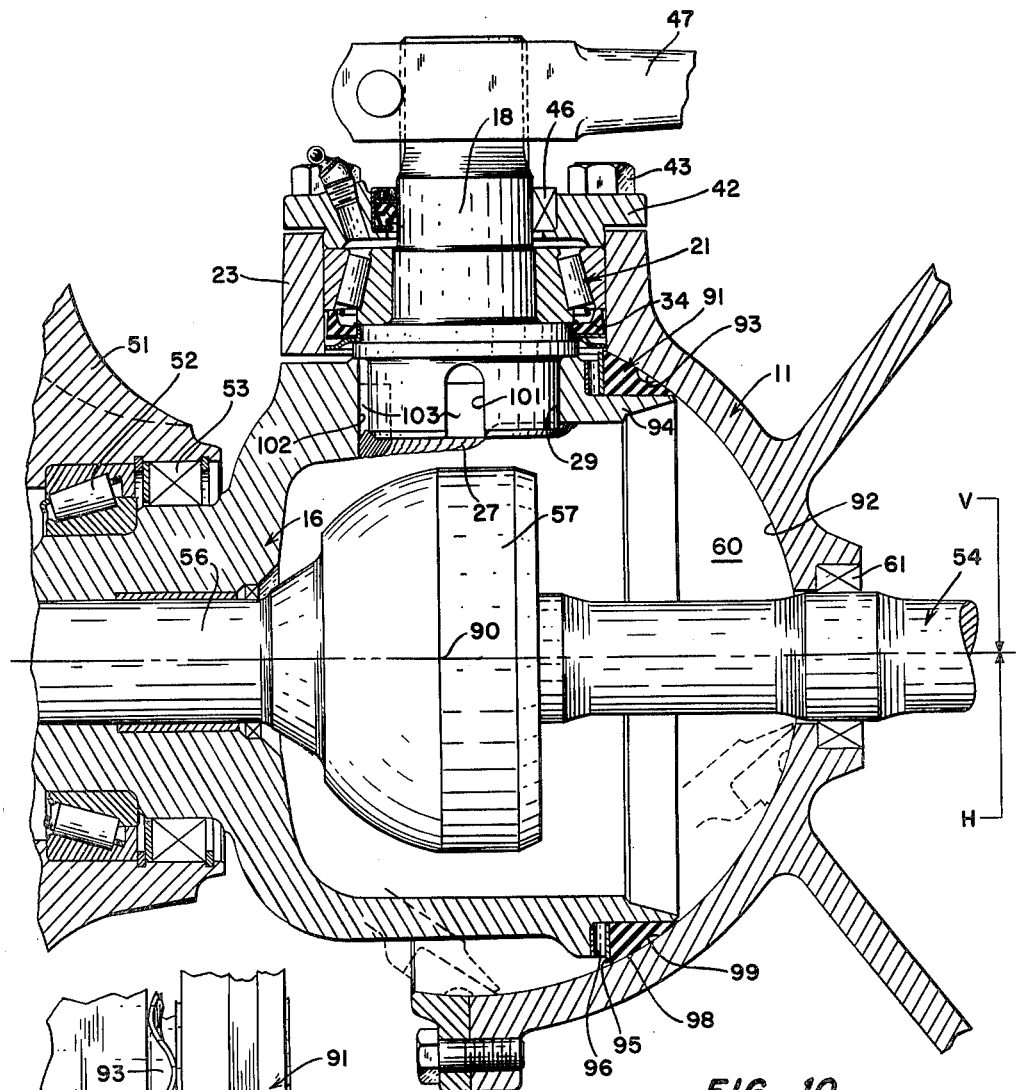
FIGURE 10 is a section similar to FIGURE 1 showing a steer drive axle having another form of seal structure.
Figure 11:
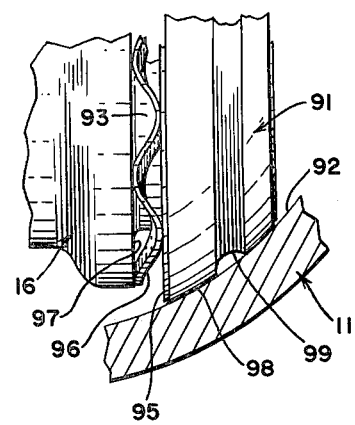
FIGURE 11 is a fragmentary elevation partly in section showing a spring bias for the flexible seal.

FIGURES 10 and 11 illustrate a further embodiment wherein the internal seal assembly 91 is of different construction and coacts with the axle housing end rather than with the drive shaft.

In FIGURE 10 the upper half of the figure is a vertical through the top trunnion as in FIGURE 1, but the lower half is a horizontal section in a plane at right angles thereto, for convenience of illustration and description.

Essentially the axle parts are the same as in the earlier embodiment, similar parts being given the same numerals. Axle housing 11 and adapter plate 23 mount the trunnion bearings as in FIGURE 1, and the spindle 16 carries the trunnions and mounts the wheel 51.

In this embodiment the outwardly facing surface 92 of the axle housing is machined and ground to smoothly spherical contour with its center at 90 which is the center of turning of universal joint 57, and the flexible seal assembly 91 is a solid annulus of synthetic rubber or like resilient deformable material surrounding the outer cylindrical surface 93 on the hollow end boss 94 of the spindle. Bonded as by vulcanizing upon the inner side of seal ring 91 is a sheet metal back up ring 95, and an axially compressed spring 96 is interposed between back up ring 95 and the flat radial surface 97 on the spindle.

As shown in FIGURE 11 the external surface 98 of rubber ring 91 is smoothly spherical in contour shaped to conform to housing surface 92 and smooth enough to move easily thereover as the spindle is turned during steering. A continuous circumferential groove 99 interrupts surface 98 to make the seal more flexible and extrap solid particles.

Spring 96 is a continuous sinuously curved spring metal plate ring surrounding surface 93, its shape being best shown in FIGURE 11, and it acts to constantly urge seal ring 91 in sealing contact against the housing surface 92. Even during the extreme angular turning of the spindle, about 35° in either direction as shown in dotted lines in FIGURE 10, there is no change in the resiliently urged sealing contact of ring 91 and the axle housing. This seal also protects the internal universal joint from dirt and moisture.

The trunnion 18 may be formed with keyways 101 opposite similar keyways 102 in spindle bore 29, to receive keys 103. This aids the ringweld 27 in fixing the trunnion.

In both embodiments of the invention, the internal seal mounted on the spindle end is protected by the surrounding rigid axle housing against injury by foreign objects such as sharp stones flung up from the roadway and effectively shielded against damaging fluids.

In both embodiments the illustrated structure is the same at each end of the transverse housing 11.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a steer drive axle, a nonrotatable axle housing having an axially outwardly open outer end formed internally with an outwardly concave sealing surface of substantially spherical contour, a wheel mounting spindle having its inner end disposed within said axle housing end and projecting outwardly therefrom, means providing an axially projecting seal mounting terminal in the inner end of said spindle adjacent to but spaced from said concave surface, substantially vertical upper and lower aligned trunnions extending into bearings on said axle housing for rotatably mounting said spindle for turning movement on said axle housing, a drive axle assembly extending rotatably through said axle housing having a universal joint section disposed within the inner end of said spindle substantially on the axis of rotation of said spindle and a stub shaft section extending outwardly through said spindle and an annular resilient seal assembly mounted on said terminal in sliding sealing engagement with said surface.

2. In a steer drive, axle, a nonrotatable axle housing having an enlarged axially outwardly open outer end formed with an outwardly concave spherical sealing surface, a wheel mounting spindle having an enlarged axially open inner end disposed within said axle housing end, substantially vertical trunnion means mounting said spindle for turning movement on said axle housing, a drive axle assembly extending through said axle housing having a universal joint section disposed within the inner end of said spindle and a stub shaft section extending outwardly through said spindle, an annular boss on the inner end of said spindle adjacent said housing surface, and a flexible internal seal annulus mounted on said spindle boss in the space enclosed by said housing outer end in sliding sealing engagement with said surface.

3. In a steer drive axle, a nonrotatable axle housing having an axially open outer end, a wheel mounting spindle having its inner end journaled within said axle housing on upper and lower trunnions, and an annular flexible seal assembly comprising an annulus of solid resilient material mounted on the inner end of said spindle, said annulus and housing having correspondingly shaped annular arcuate surface areas in sliding sealing engagement, and the sealing surface of said annulus being interrupted by an annular groove.

References Cited by the Examiner

UNITED STATES PATENTS

| | | | |
|---|---|---|---|
| 1,200,721 | 10/1916 | Gibney | 180—43 |
| 1,407,911 | 2/1922 | Batenburg | 180—43 |
| 1,695,579 | 12/1928 | Dusseau | 180—48 |
| 1,734,709 | 11/1929 | Bayley | 180—48 |
| 1,881,202 | 10/1932 | Livingood | 180—43 |
| 1,903,913 | 4/1933 | Parrett | 180—43 |
| 1,995,987 | 3/1935 | Keese | 180—43 |
| 2,042,404 | 5/1936 | Keese | 180—43 |
| 2,075,563 | 3/1937 | Alden | 180—43 |
| 2,356,164 | 8/1944 | Keese | 180—43 |

FOREIGN PATENTS

| | | |
|---|---|---|
| 826,440 | 1/1960 | Great Britain. |

A. HARRY LEVY, *Primary Examiner.*